A. W. FRENCH.
STIRRER FOR MEAL COOKERS AND THE LIKE.
APPLICATION FILED JULY 5, 1913.

1,168,621.

Patented Jan. 18, 1916
2 SHEETS—SHEET 1.

Witnesses.
C. T. Dimond
K. E. Wilhelm

Inventor.
Alfred W. French
by Wilhelm Parker & Hard
Attorneys.

A. W. FRENCH.
STIRRER FOR MEAL COOKERS AND THE LIKE.
APPLICATION FILED JULY 5, 1913.
1,168,621.
Patented Jan. 18, 1916.
2 SHEETS—SHEET 2.
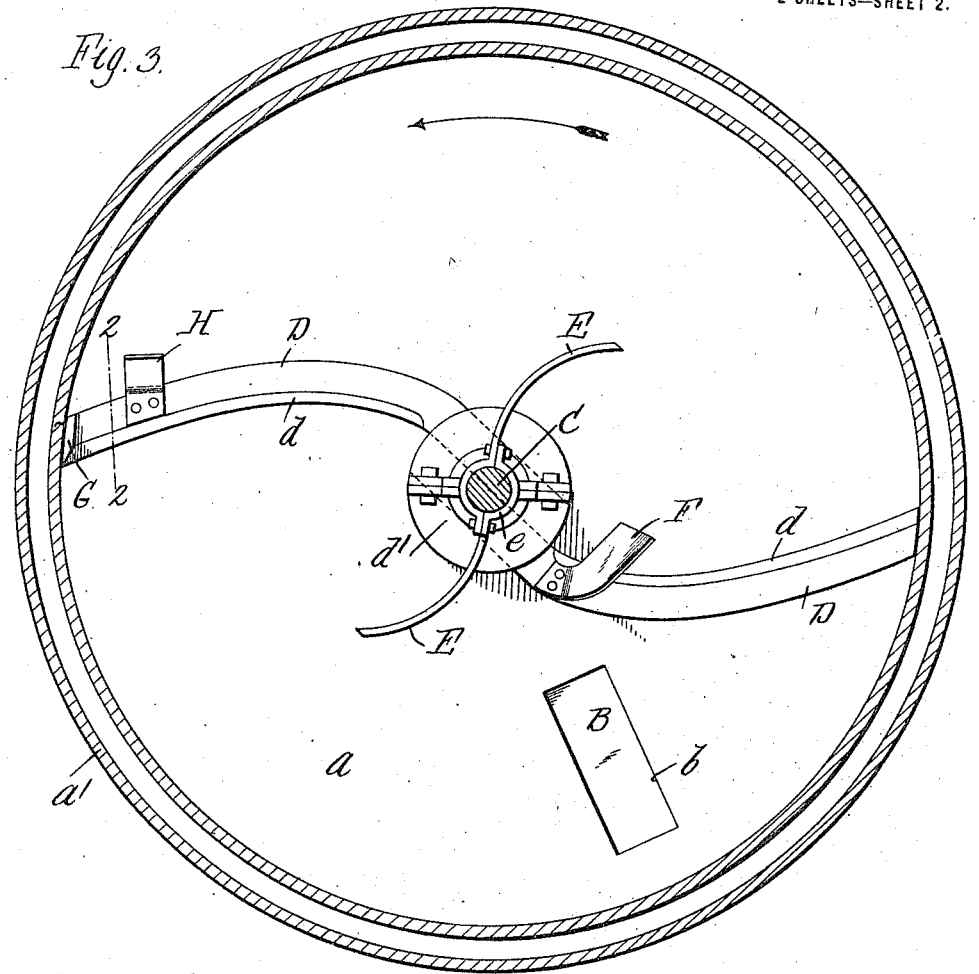
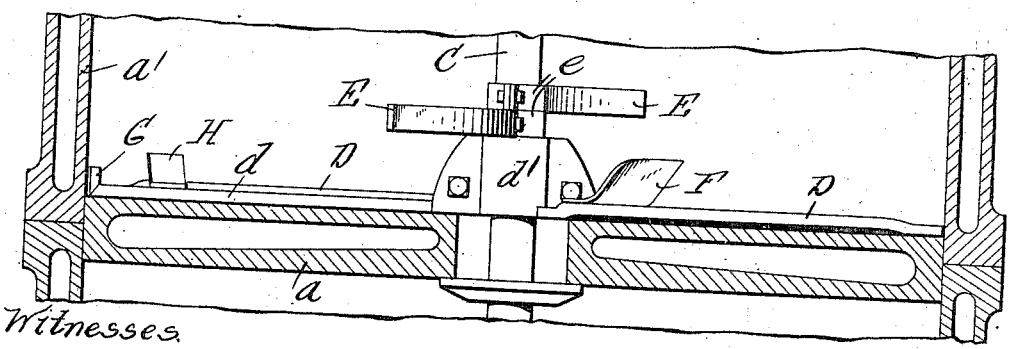

UNITED STATES PATENT OFFICE.

ALFRED W. FRENCH, OF PIQUA, OHIO.

STIRRER FOR MEAL-COOKERS AND THE LIKE.

1,168,621.

Specification of Letters Patent.

Patented Jan. 18, 1916.

Application filed July 5, 1913. Serial No. 777,599.

*To all whom it may concern:*

Be it known that I, ALFRED W. FRENCH, a citizen of the United States, residing at Piqua, in the county of Miami and State of Ohio, have invented a new and useful Improvement in Stirrers for Meal-Cookers and the like, of which the following is a specification.

This invention relates to cookers or heaters of the kind used for cooking oil bearing meal or material preparatory to expressing the oil therefrom, and more particularly to the means employed in apparatus of this nature for stirring the material.

In cooking oil meal it is desirable to heat the meal as rapidly as possible. This makes it necessary to keep up a steady and thorough circulation of the meal in the kettle in order to prevent it from burning, to brighten the meal, and to bring fresh portions of the meal more or less continually to the surface in order to liberate the excess moisture therefrom. At the same time it is essential to the best results to keep the surface of the meal substantially level and not permit it to pile up higher at the outer portion of the kettle than at the center thereof. If the meal is damp and the surface thereof is depressed at the center of the kettle, which is a common occurrence with the stirrers heretofore employed, lumps of meal rolling over each other near the center of the kettle cause the formation of "water balls," which oftentimes become as large as six to ten inches in diameter. These "water balls" float on the surface of the meal and are very troublesome.

The purpose of this invention is to produce an efficient and practical stirring means which produces a steady thorough circulation of the meal in such a manner as to obviate objections and secure the desired results above mentioned.

Figure 1:
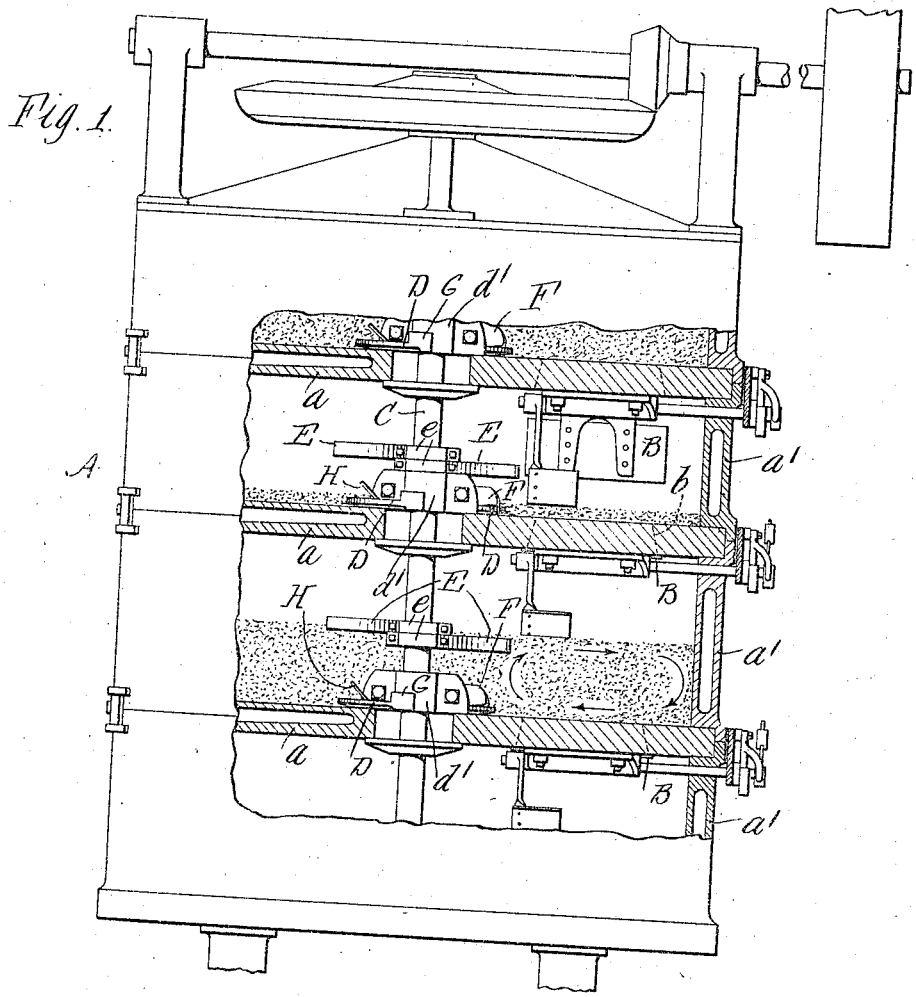
Figure 2:
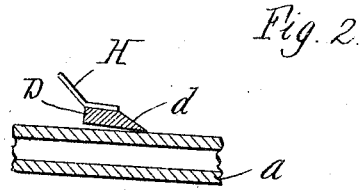

In the accompanying drawings consisting of two sheets: Figure 1 is an elevation partly in section of a meal cooker provided with stirring means embodying the invention. Fig. 2 is a section in line 2—2, Fig. 3. Fig. 3 is a horizontal section on an enlarged scale of one of the cooker chambers showing the stirrer in place. Fig. 4 is a sectional elevation thereof.

Like reference characters refer to like parts in the several figures.

A represents a meal cooker or heater of known construction, comprising a series of kettles or chambers which are arranged one over the other, and have hollow bottoms and side walls $a$ and $a'$, respectively, to which steam is supplied for heating the material in the chambers. The chambers have bottom discharge openings $b$ through which the material discharges from one chamber to that next below. The discharge opening of each chamber, except the bottom one, is preferably provided with a gate B which is adapted to open downwardly into the chamber next below and to control the discharge of the material from one chamber to the other as described, for example in one or another of several applications and patents in the name of myself and Michael W. Faherty. This invention is not, however, necessarily restricted to any particular arrangement of the chambers of the cooker, nor to the arrangements of the discharge gates or means for controlling the discharge of the material from chamber to chamber.

The stirrer for each kettle or chamber consists of a rotary vertical shaft C arranged centrally in the chamber and provided with lower arms or sweeps D and upper arms or sweeps E which are fixed to and project outwardly in the chamber from said shaft. When the chambers or kettles of the cooker are arranged one over the other, as illustrated in the drawings, a single central shaft extending vertically through the cooker serves for the stirrers in the several chambers. This invention, however, is concerned only with the construction and arrangement of the stirring devices in the individual kettles or chambers and not with the driving means for the stirrers which may be varied as required to suit cookers having the chambers differently arranged.

The lower arms or sweeps D are arranged to rotate in the lower portion of the chamber and curve or incline from a radial direction forwardly with respect to the direction of rotation of the stirrer, thereby causing an inward motion of the material toward the center of the chamber in addition to its rotary motion with the stirrer. The upper arms or sweeps E rotate in the same direction, but are curved or inclined oppositely, that is rearwardly with reference to the direction of rotation of the stirrer so as to produce an outward as well as a rotary motion of the surface portion of the material.

The lower arms or sweeps D are preferably formed with beveled front edges $d$ and are inclined or tilted crosswise, as shown in Fig. 2, so that they will scrape the bottom of the chamber and prevent the material from packing under the arms or sweeps. The upper arms or sweeps E need not be as long as the lower ones, and when a gate is used, such as shown in the drawings, which depends into the chamber, the upper arms or sweeps are made short enough to pass the gate without striking it.

The arms or sweeps can be secured to the stirrer shaft in any suitable way. As shown the lower arms D are fixed in a hub $d'$ secured to the shaft, while the upper arms are secured one above the other on the shaft by clamps $e$. By placing the upper arms one above the other they take care of varying depths of material. If the level of the material is comparatively low the lower arm D will be substantially at the surface, whereas if the level is higher the upper arm E will be substantially at the surface, so that one or the other arm E can be relied upon to push the surface material outwardly.

F represents a wing or plow which inclines upwardly, outwardly and forwardly from the inner end of one of the bottom arms D. This wing causes an upward motion of the material at the center of the chamber and coöperates with the lower arms D and upper arms E to cause the material to circulate inwardly at the bottom of the chamber, then upwardly at the center of the chamber, and then outwardly at the surface portion of the material.

One of the bottom arms D is preferably provided with an upturned outer end G for scraping the material from the upright wall of the chamber and with an upwardly and rearwardly inclined plate H which produces a sort of wave in the material which is utilized in closing the gate.

The stirrer constructed as described produces a very thorough stirring of the material. It acts to bring fresh portions of the material more or less continuously to the surface and to shove the surface portion of the material outwardly or away from the center of the chamber, thus effectively breaking up any "water balls."

I claim as my invention:

1. A rotary stirrer for heating chambers and the like, comprising a lower part constructed to cause an inward motion of the material in the lower portion of the chamber, a part constructed to cause an upward motion of the material in the central portion of the chamber, and a part constructed to cause an outward motion of the surface portion of the material, substantially as set forth.

2. A rotary stirrer for heating chambers and the like, comprising a lower arm which inclines forwardly with respect to its direction of rotation and causes an inward motion of the material in the lower portion of the chamber, an upper arm which inclines rearwardly with respect to its direction of rotation and causes an outward motion of the surface portion of the material, and a part which is inclined upwardly and rearwardly to cause an upward motion of the material in the central portion of the chamber, substantially as set forth.

3. A stirrer for heating chambers and the like, comprising upper and lower rotary arms, said lower arm being inclined forwardly and said upper arm rearwardly with respect to the direction of rotation thereof, and a wing on the inner portion of said lower arm which is arranged to cause an upward motion of the material at the central portion of the chamber, substantially as set forth.

4. A rotary stirrer for heating chambers and the like, comprising long lower arms which scrape the bottom of the chamber and incline forwardly with respect to the direction of rotation of the stirrer, a plurality of shorter upper arms which move in planes one above the other and incline rearwardly with respect to the direction of rotation of the stirrer, an upwardly and rearwardly inclined wing at the inner portion of one of the lower arms, and an upwardly projecting part on the outer portion of one of said lower arms.

5. A rotary stirrer for the material in heating chambers and the like, comprising upper and lower laterally extending arms arranged to rotate in the same direction at different elevations, said lower arm extending outwardly from the axis of rotation and bent forwardly from a radial line passing through said axis and said upper arm extending outwardly from the axis of rotation and bent rearwardly from a radial line passing through said axis with respect to the direction of rotation of said arms, whereby the material is caused to circulate in the chamber and is moved gradually inwardly toward the axis of rotation of the stirrer by the lower arm and outwardly away from such axis by the upper arm.

Witness my hand, this 19 day of June, 1913.

ALFRED W. FRENCH.

Witnesses:
M. WHITLOCK,
C. B. UPTON.